US008527865B2

(12) United States Patent
Li et al.

(10) Patent No.: US 8,527,865 B2
(45) Date of Patent: Sep. 3, 2013

(54) SPREADSHEET FORMULA TRANSLATION OF SERVER CALCULATION RULES

(75) Inventors: Baomin Li, Renton, WA (US); George Yan, Bellevue, WA (US); Mark Yang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 12/126,258

(22) Filed: May 23, 2008

(65) Prior Publication Data
US 2009/0292730 A1 Nov. 26, 2009

(51) Int. Cl.
*G06F 17/00* (2006.01)
*G06F 7/00* (2006.01)

(52) U.S. Cl.
USPC ............ 715/212; 715/213; 715/219; 707/694

(58) Field of Classification Search
USPC ................. 715/212, 213, 214, 215, 216, 219
See application file for complete search history.

(56) References Cited

U.S. PATENT DOCUMENTS

| 6,138,130 | A | 10/2000 | Adler et al. | |
|---|---|---|---|---|
| 6,988,241 | B1 | 1/2006 | Guttman et al. | |
| 7,299,223 | B2 | 11/2007 | Namait et al. | |
| 2003/0055843 | A1 | 3/2003 | Chiu | |
| 2004/0181748 | A1* | 9/2004 | Jamshidi et al. | 715/503 |
| 2005/0039114 | A1* | 2/2005 | Naimat et al. | 715/503 |
| 2006/0010367 | A1 | 1/2006 | Sattler et al. | |
| 2007/0061344 | A1 | 3/2007 | Dickerman et al. | |
| 2007/0219956 | A1 | 9/2007 | Milton | |
| 2007/0220415 | A1* | 9/2007 | Cheng et al. | 715/503 |
| 2007/0250764 | A1 | 10/2007 | Jiang | |

OTHER PUBLICATIONS

White, "Integrating Applications with PerformancePoint Planning", Dec. 4, 2007, Microsoft Corporation.
Augenstein, "SQL Server Executive: Embracing BI across the Enterprise", DM Review Magazine, Sep. 2007, Data Management Review and SourceMedia, Inc.

* cited by examiner

*Primary Examiner* — Pierre Vital
*Assistant Examiner* — Berhanu Mitiku

(57) ABSTRACT

Architecture includes for translating server calculations into client application formulas. The architecture determines dependencies, performs formulae translation, and processes data retrieval queries using the translated formulae. In one implementation, the architecture translates performance management server calculations into spreadsheet application formulas so that the impact of changes can be reflected immediately. Moreover, this technique does not require updating and querying of the performance management server. An algorithm is provided that allows translation of the backend formula (e.g., MDX—multidimensional expressions) directly into the spreadsheet application such that the impact on calculated values by an input change can be reflected instantaneously in the sheet.

20 Claims, 10 Drawing Sheets

SPREADSHEET FORMULA TRANSLATION OF SERVER CALCULATION RULES

BACKGROUND

A performance management server is a platform that can support business models and business conventions. On top of the platform complex multidimensional business calculations can be defined. Performance management server implementations typically use a classical client/server approach, where calculations are defined, saved, and maintained on the server.

Data in the performance management server backend store is usually manipulated using spreadsheet applications. To obtain the latest correct changes of the impending changes from the spreadsheet client, those changes are submitted to performance management server. The performance management server then performs the operations, and subsequently, the spreadsheet application fetches the calculated data from the performance management server which is then displayed in the spreadsheet application as pure data.

A drawback of this approach is that if the user changes one of the input cells on the sheet and the input has an impact on a calculated value on the same sheet, the new calculated value needs to be re-calculated on the backend server and re-fetched back to the sheet requiring a poorly performing three-step round-trip operation (write back the new input, calculate the new value, and then re-fetch the new value). This procedure makes the user experience less user friendly and further places a burden on server, thereby reducing server availability and scalability.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture translates performance management server calculations into spreadsheet application formulas so that the impact of changes can be reflected immediately. Moreover, this technique does not require updating and querying of the performance management server. An algorithm is provided that allows translation of the backend formula (e.g., MDX—multidimensional expressions) directly into the spreadsheet application such that the impact on calculated values by an input change can be reflected instantaneously in the sheet. The algorithm considers dependency determination, formula translation, and data retrieval queries.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
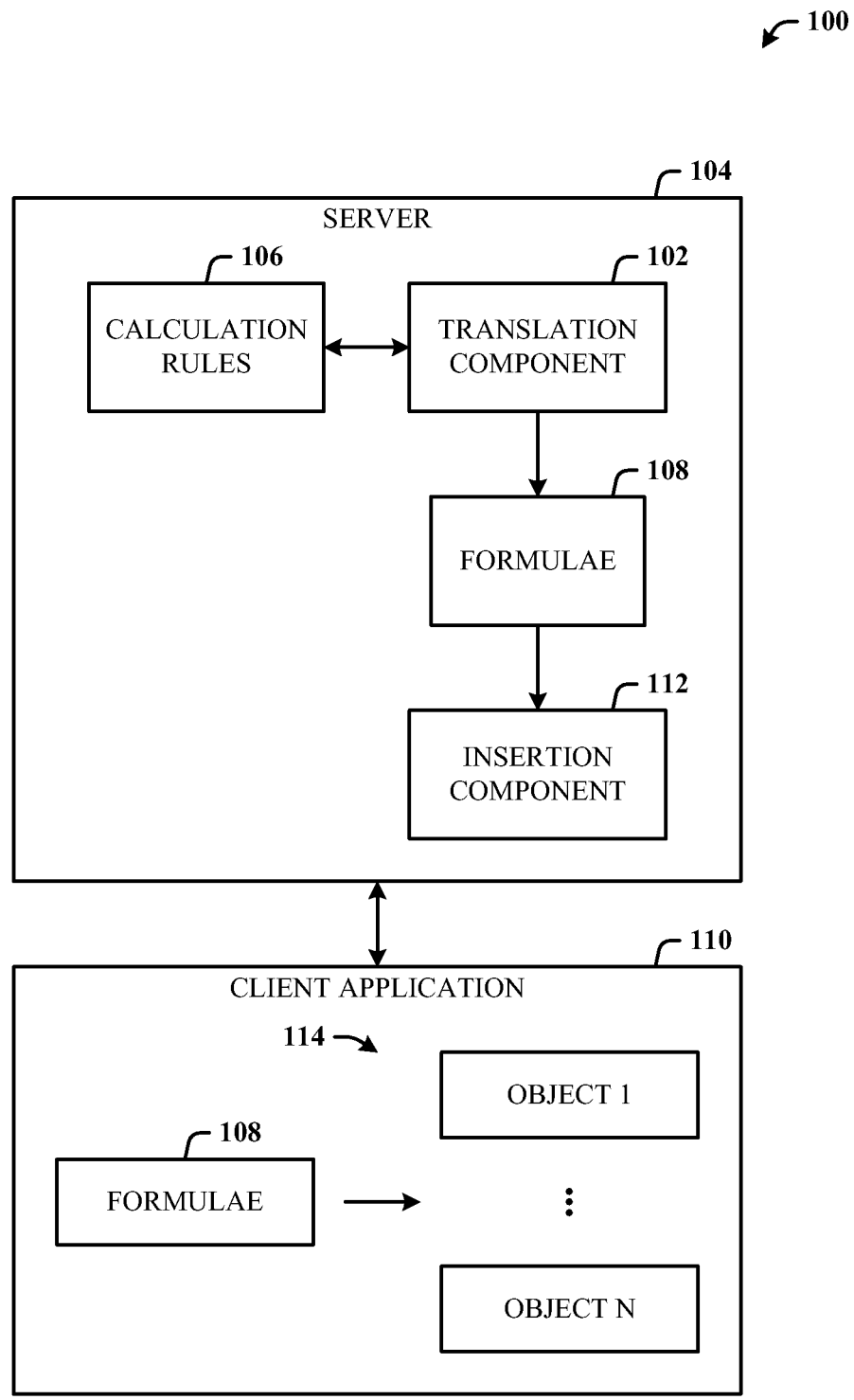
FIG. 1 illustrates a computer-implemented system for handling data.

The disclosed architecture includes one or more algorithms for translating server calculations into client application formulas. The architecture determines dependencies, performs formulae translation, and processes data retrieval queries using the translated formulae.

This technique immediately addresses problems such as scalability and local cube issues. Scalability issues can be encumbered with frequent server trips and multiple sessions of "what if" queries. Consequently, the server can be severely burdened when the number of users is large. Offline solutions can rely on a local cube. The local cube deployment has many issues such as external bugs, large downloaded data, incomplete formulas, etc. Translating formula (e.g., MDX—multi-dimensional expressions) directly to the client application (e.g., spreadsheet documents) can eliminate most of the needs associated with a local cube.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for handling data. The system 100 includes a translation component 102 of a server 104 for translating server calculation rules 106 into formulae 108 compatible with a client application 110. The system 100 can also include an insertion component 112 at the server 104 for inserting the formulae 108 into the client application 110 in association with application objects 114, the formulae 108 processed for client-side calculations.

The server 104 can be a performance management server, the client application 110 can be a spreadsheet application, and the formulae 108 are associated with the objects 114, which are cells of the spreadsheet application. The formulae facilitate calculation of dynamic data changes in the client application.

Figure 2:
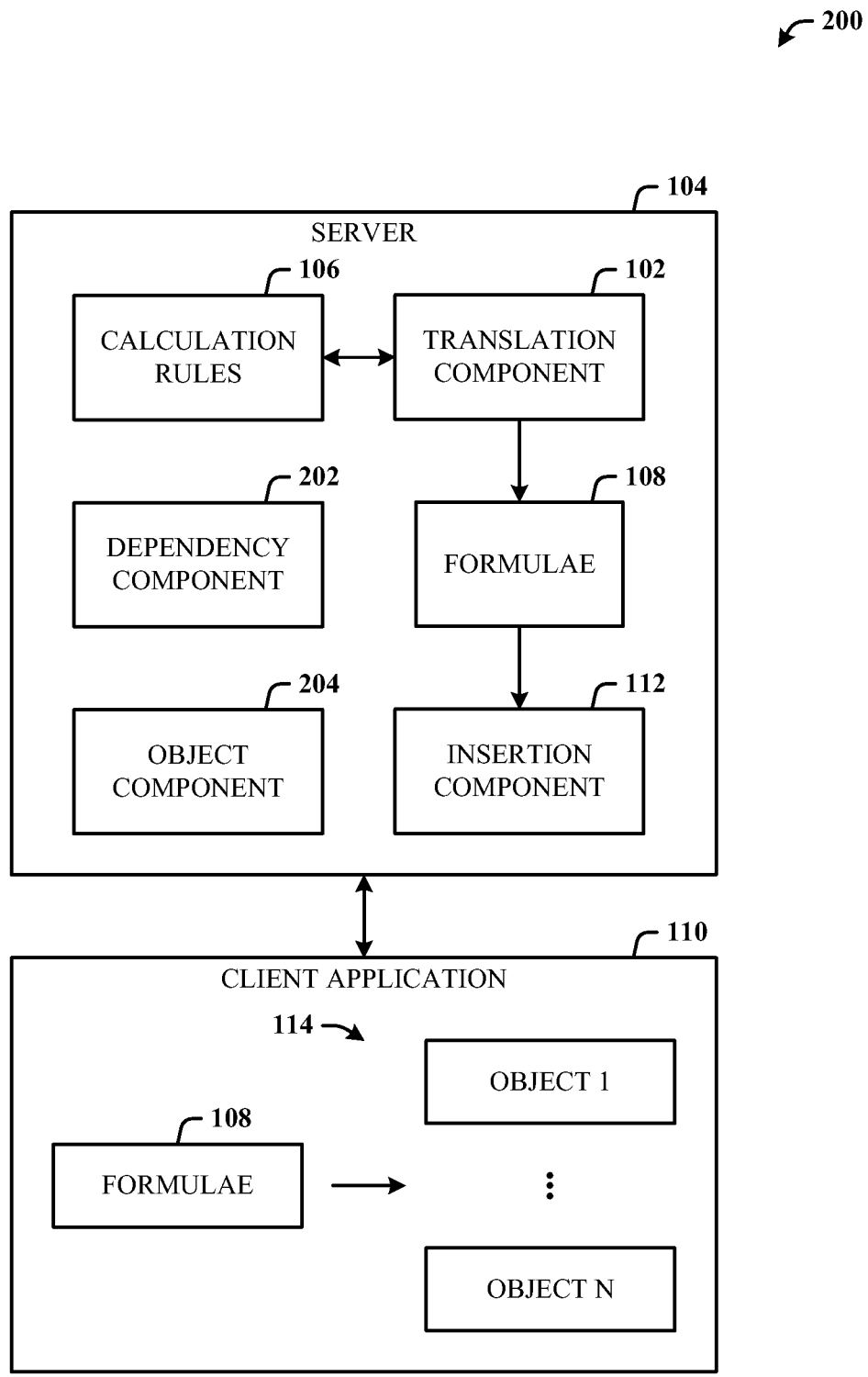
FIG. 2 illustrates a more detailed exemplary system for handling data via formulae translation of server calculation rules.

FIG. 2 illustrates a more detailed exemplary system 200 for handling data via formulae translation of server calculation rules. The system 200 includes the server 104 and associated components (102 and 112), but further includes a dependency component 202 and object component 204. The dependency component 202 finds dependent objects (e.g., cells) in the client application. This is accomplished in part by the dependency component 202 generating a dependency graph of objects/members dependent on input objects/members (e.g., objects 114) of the client application 110. The object component 204 computes which of the application objects 114 is mapped to a formula translated from the calculation rules 106.

In a more specific implementation, the translation component 102 translates the server calculation rules 106 into formulae compatible with a client application, which is a spreadsheet application. In this environment, the dependency component 202 finds dependent cells in the spreadsheet application based on a dependency graph of cells dependent on input cells. The object component 204 computes which of the application cells is mapped to a formula. The insertion component 112 inserts the formulae into the spreadsheet application in association with application cells for client-side calculations. The dependency component 202 reduces the spreadsheet to pure data cells a query for which can be performed as a batch query, and the input cells that map to data cube cells of the server 104. The dependency component 202 analyzes dependencies of MDX formulae of the server 104 and finds dimension level dependencies by transitive closure. The object component 204 groups the input cells of the spreadsheet into a set of disjoint regions, finds a combined set of dependent target cells based on the regions, and finds target cells of the spreadsheet based on the combined set. Other functionality and operations will now be described in greater detail.

Figure 3:
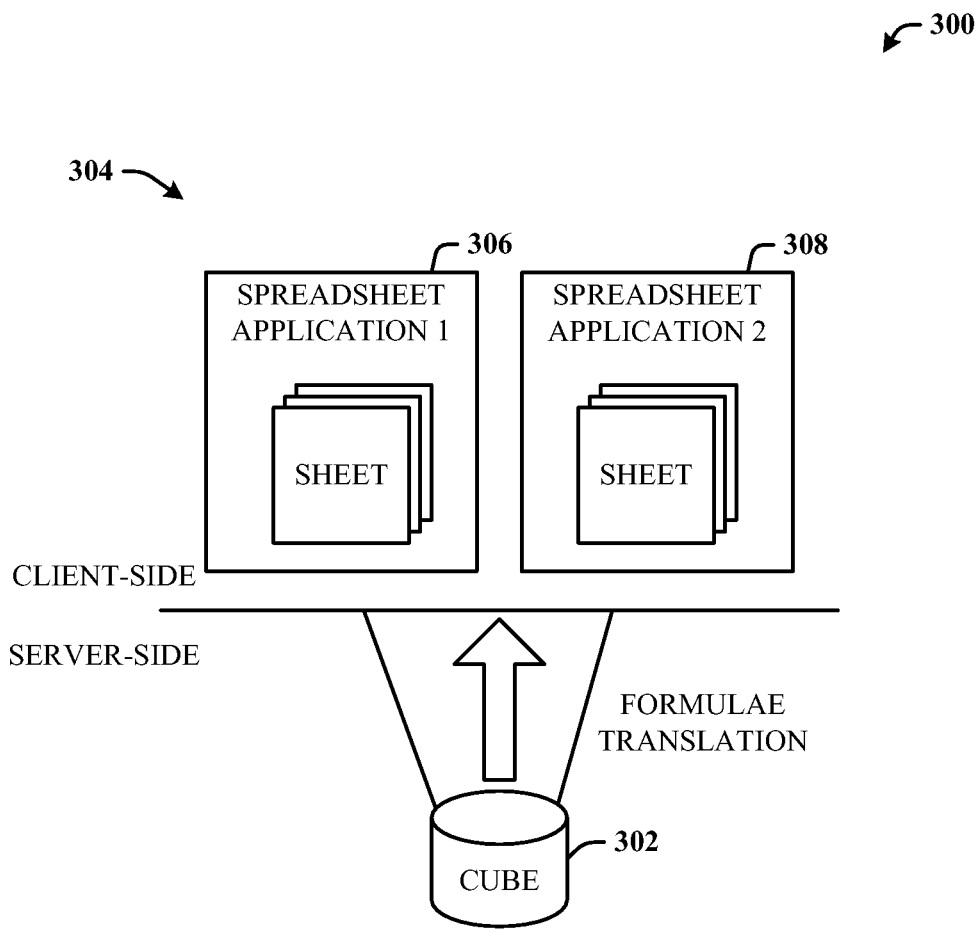
FIG. 3 illustrates a general representation for formulae translation of calculation rules of a server-side data cube to sheets of client-side spreadsheet applications.

FIG. 3 illustrates a general representation 300 for formulae translation of calculation rules of a server-side data cube 302 to sheets of client-side spreadsheet applications 304. Rather than implementing a spreadsheet calculation engine on the server-side, the formulae are translated server-side and uploaded to the client-side. The translated formulae can be applied to cells of sheets in a first spreadsheet application 306 and/or a second spreadsheet application 308. Thus, the computing load is moved from the server-side to the client-side. Calculations can be much faster in the client than on the server, since round-trip queries to the server for data are reduced.

The disclosed translation architecture allows the backend server formulae translated directly onto the client application so impact to any calculated values by an input change can be reflected instantaneously on the application document (e.g., sheet). The architecture a solution to the handling of data required for the calculation but that is not yet present on the sheet. The brute-force approach of including all data required for a calculation on the sheet is impractical because of the potentially huge volume of data. For example, 2007=2006*110% for every account, entity, product, etc. This simple expression represents a huge number of cell dependencies. Additionally, aggregations by the cube 302 are to be reflected on the sheet, making the formula translation problem more complicated.

Difficulties of MDX-to-sheet translation can include the following. Straightforward cell-to-cell translation does not work because this translation cannot handle calculations that require data not on the sheet. For example, consider Revenue=price1*volume1+price2*volume2. Price1 and volume1 are not on the sheet. Another difficulty is handling inter-dependencies between different calculations. For example, Revenue=price1*volume1+price2*volume2, where volume1=volume3*110%. Volume3 is on the sheet but the rest of the cells are not on the sheet. Yet another difficulty involves the handling of aggregations. For example, consider that the Total (revenue for all entities)=(account.revenue, entity.all). The sheet contains only the account dimension and a single entity.

Solutions to these difficulties include understanding what objects (cells) are to be variables and what objects (cells) are constants. In other words, when fixing a set of input cells, find the cells that are dependent on this set. Even if the dependencies are known, this information is to be utilized to transform the formulas to a reduced form.

The following description is in the context of formulae translation for spreadsheet applications. However, it is to be understood that the formulae translation architecture is suitable for applications that associate formulae to document objects to calculate values for the objects.

A goal of dependency analysis is to find what other cells on the sheet are dependent of the input, given a set of input cells. As previously stated, the brute-force cell level dependency analysis is impractical because the huge number of cells involved. The dependency analysis reduces cell level dependencies into dimension member dependencies.

Single step dependency can be analyzed according to two methods: forward and backward. With respect to forward dependency analysis, given a cell C find all cells that can affect C. With respect to backward dependency analysis, given a cell C find all cells that can be affected by C. Affected cells are called target cells, and cells that can affect other cells are called source cells. Forward dependency analysis is intuitive in that the relationship between target cell and source cell given in MDX is in the desired format. For example, This=time.currentMember.lag(−1)+sum(entity.currentMember.children). However, it is less efficient to perform forward analysis when the dependencies are restricted to the sheet. Backward dependency analysis is less intuitive from the MDX point of view; however, backward dependency analysis is more efficient due to starting with a much smaller set of input cells. The backward dependency analysis approach is employed.

The disclosed approach keeps cell level data dependency explicitly so the dynamic calculation of data change is fast compared to prior approaches (e.g., perform blank re-calculation on demand). By extending formulae translation to the server side realtime collaborative planning, budgeting and forecasting can be provided. The architecture also solves how to handle data required for the calculation but that is not yet present on the sheet.

Continuing with the dependency analysis, a cell of a sheet of a spreadsheet application is called an input cell if the cell is intended to be used for user input; otherwise, non-input cells are called display cells. This description pertains to cells that map to cells in the server cube. A cell c1 is called dependent on another cell c2 if changing the value of c2 affects the value of c1 via formulas or aggregations defined in the cube.

Accordingly, the architecture finds a way to determine what display calls are dependent on the input cells. For each display cell that is dependent on any of the input cells, the display cell is calculated by a spreadsheet formula (derived from the backend MDX formulas and aggregations). The remaining cells can be treated as pure data as far as this particular sheet is concerned (though the backend cube may still have formulas defined on these cells). This reduction drastically reduces the number of data brought to the client side for calculation purposes. This is because as long as a calculation is not dependent on the input cells, the calculation can be reduced to a single constant. Other types of reductions are described hereinbelow as well.

If a cell c1=(d11, d12, d13 . . . ) is dependent on c2=(d21, d22, d23 . . . ) for some dimension members d12, d13, d22, d23 then it is said that dimension member d11 is dependent on dimension member d21. The same definition can be used to define dimension member dependency on other dimensions. In general, a set of dimension member dependencies does not imply a cell level dependency, and a cell level dependency does not imply a set of dimension member dependencies; however, since generally, MDX calculations do not allow cross-dimensional correlation (with a possible exception of generate( ) or ToString( ) type of constructs, which are very rare), MDX calculations for cell level dependency and a set of dimension member dependencies are equivalent, and one can derive one from the other.

This observation allows the reduction of the cell level dependence issue to a set of dimension member level dependency issues. Because of this reduction, the terms "cell" and "member" (similarly, "cell set" and "member set") are used interchangeably herein the context of dependency analysis.

Cell and dimension dependency via a single step. A cell c1 is dependent on a cell c2 via a single step (and similarly a dimension member m1 is dependent on another dimension member m2 via a single step) if c1 is calculated directly from c2 by at least one MDX formula in the cube, or c1 is an aggregation involving c2.

To analyze dependencies for MDX formulas, the common form of such formulas is examined. MDX calculations can be expressed as, $$\text{Current tuple} = f(v(\text{tuple 1}), v(\text{tuple 2}), ..., ng1(\text{tuple set 1}), ng2(\text{tuple set 2}), ..., h1(\text{member 1}), h2(\text{member 2}), ..., I1(\text{member set 1}), I2(\text{member set 2}), ...)$$

where v(tuple) is the value of the tuple; ng( ) is one of the numeric aggregation functions such as SUM( ), AVG( ), COUNT( ), etc.; h( ) are numeric functions such as member.level; I( ) are numeric functions such as COUNT(member set); and, $f$( ) is a numeric arithmetic function of its arguments, such as (a+b*c). This description considers tuple set/member set functions SUM( ), AVG( ) and COUNT( ).

Each tuple, tuple set, member, and member set in the above expression is called a factor. A factor is called a 1-1 factor if it is a tuple or a member. A factor is called a 1-n factor if it is a tuple set or member set.

For each 1-1 factor, there is a 1-1 mapping between each dimension coordinate of the current tuple and the corresponding dimension coordinate of the factor. For an 1-n factor there is an 1-n mapping between each dimension coordinate of the current tuple and the corresponding dimension coordinates of the tuple sets or member sets. In a mapping between coordinates of the current tuple and that of a factor in a calculation, the current tuple (or its coordinates) is called the target, and the corresponding coordinate(s) of the factor are called source(s).

Let F be a factor. Use F(target)=source, or F(target)=sourceSet, where (target, source) is a tuple or member of a dimension and sourceSet is a tuple set or member set of the dimension, to represent the 1-1 or 1-n mapping. A factor is converted to a numeric value via cell value, numeric member function or numeric member set or tuple set function. In subsequent description the term "factor" is also used to describe either a tuple, member, tuple set, member set, or the associated converted (via functions) numeric values appearing in an MDX formula.

Let S1 be a set of source cells/members in a dimension. Members S2 are the set of dependent target cells/members. Rule R is an MDX formula. All members S2 dependent on S1 via a single rule R (or aggregation) can be calculated by the following algorithmic steps. First, all ancestors of S1 map to S2 (denoted S1→S2). Second, for each 1-1 factor in rule R, and for each member s in S1, use s as a source and find the target dimension member s' by using an inverse mapping, target=F^-1 (source). Add s' to S1. Third, for each 1-n factor F in rule R and for each s in S1, find the set S'={s'| where s is in F(s')}. Add S' to S1. For example, This=time.currentMember.lag(1)+SUM(currentMember:currentMember.lag(-5)), S1={June}, and S2={Q2, February, March, April, May, June}

Note that the relationship between S' and s is a 1-n mapping G which can be derived based on the original mapping F. The derivation of G from F can be pre-calculated on a case-by-case basis.

Full dimension level dependencies by transitive closure. Starting from a set of dimension members S the single step described above can be applied repeatedly to find the transitive closure of the set S'. S' is the set of members that depends on S. When applying the single step repeatedly, if a member s' is added to S2 via multiple calculation formulae or aggregations, only one member is added based on a fixed precedence order.

As part of dependency analysis, a dependency graph (of all cells/members dependent on the input cells/members) is generated with each edge marked by either a factor of a calculation C or by aggregation edges AG. Here, it is assumed that for each dependent cell/member c, all the incoming edges (edges coming from cells/members that could affect this target) are marked by either a single aggregation or by factors of a single calculation.

Internal nodes of the graph are those which have at least one incoming edge (so the internal node is dependent on at least one other cell in the graph). To simplify the description, "graph nodes" refer only to internal nodes. For instance "a node is in the graph" means that the node is an internal node of the graph.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
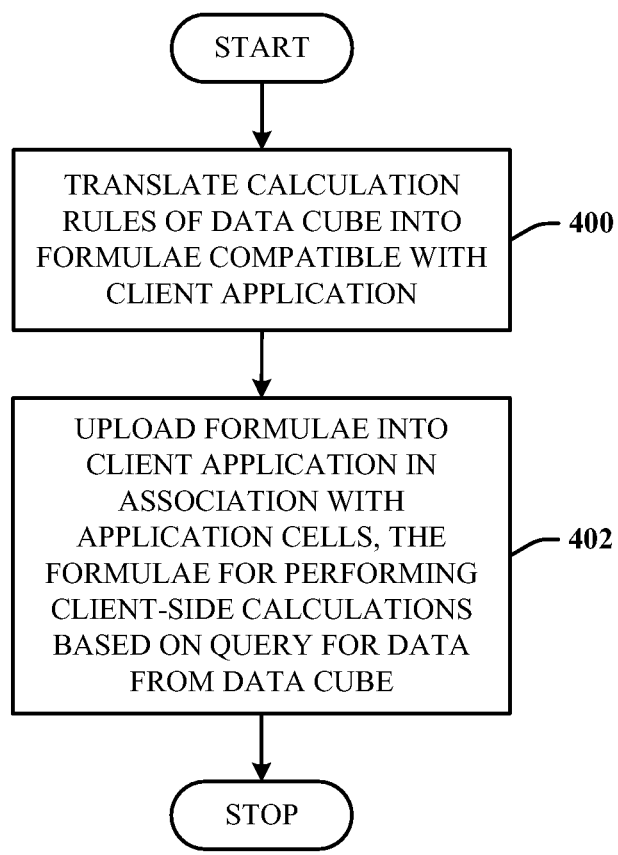
FIG. 4 illustrates a computer-implemented method of handling data.

FIG. 4 illustrates a computer-implemented method of handling data. At 400, calculation rules of a data cube are translated into formulae compatible with a client application. At 402, the formulae are uploaded into the client application in association with application input cells. The formulae for performing the client-side calculations are based on a query for data from the data cube.

The method can further comprise generating a dependency graph of cells dependent on the input cells and assigning the formulae to cells associated with internal nodes of the graph, and trimming the graph using a sheet of the client application so that an internal node is only in the graph if the internal node affects a cell on the sheet, the client application is a spreadsheet application. The method further includes generating the dependency graph of internal nodes and creating hidden cells in a sheet of a client spreadsheet application.

The process of translating calculation rules can further comprise computing a single-step dependency by finding target cells that are affected by a source cell, and computing target dimension members of a source member using an inverse mapping between the source member and the target member.

The method can further comprise querying the data cube for data, processing pure data cells as a group in a single query, and analyzing a portion of the data cube based on a sum of dimension sizes. The method further comprises reducing the data from the data cube by finding display cells dependent on input cells and treating remaining cells as pure data cells.

Figure 5:
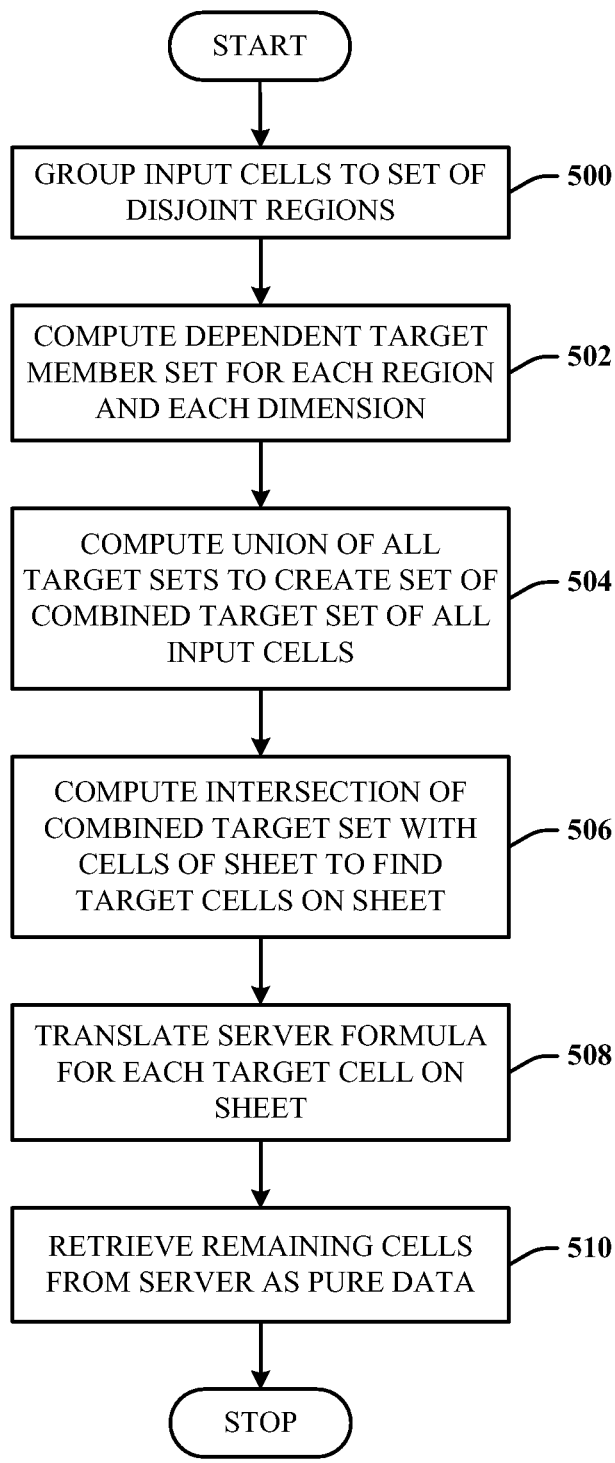
FIG. 5 illustrates a method of determining which cells on the sheet will have a formula.

FIG. 5 illustrates a method of determining which cells on the sheet will have a formula. At 500, input cells are grouped to a set of disjoint regions (e.g., rectangular). At 502, the dependent target member set is computed for each region and for each dimension. At 504, the union of the all target sets is computed to create a set of combined targets of all the input cells. At 506, the combined target set is intersected with the cells of the sheet to obtain all the target cells on the sheet. At 508, for each target cell on the sheet, the appropriate server formula is translated to the sheet. At 510, the remaining cells are retrieved from the server as pure data.

Figure 6:
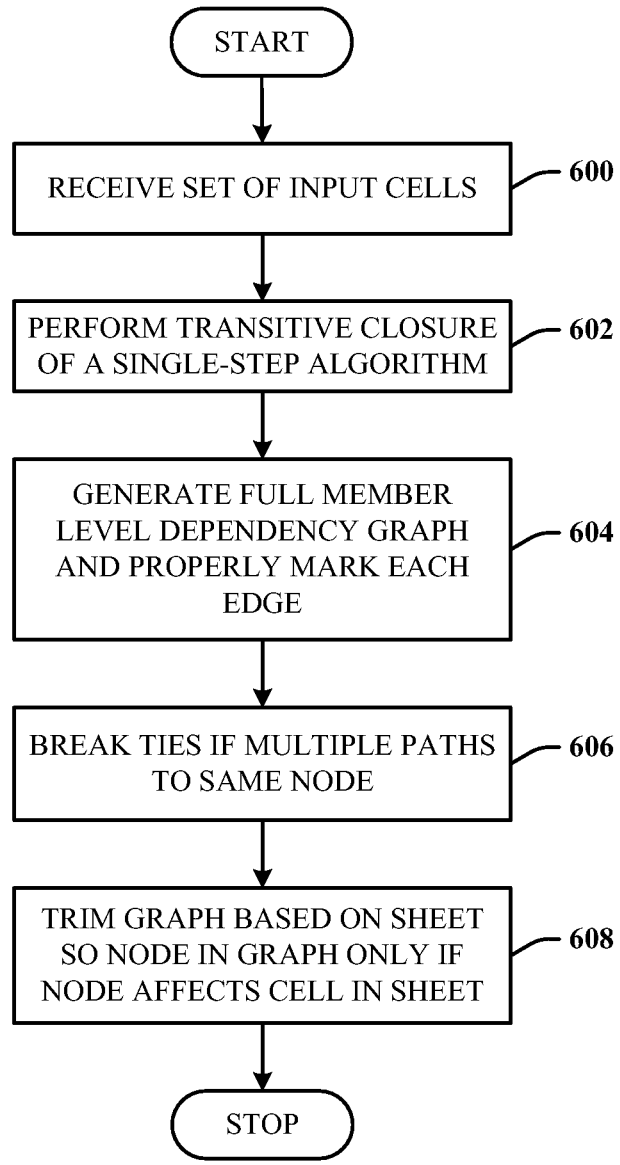
FIG. 6 illustrates a method of determining full dependency.

FIG. 6 illustrates a method of determining full dependency. At 600, a set of input cells is received. At 602, transitive closure of a single-step algorithm is performed. At 604, a full member level dependency graph is generated and each edge is properly marked (by aggregation or by some factor of a formula). At 606, if there are multiple paths to the same node, the ties are broken. At 608, the graph is trimmed by the sheet so that a node is in the graph only if the node can affect a cell on the sheet.

Figure 7:
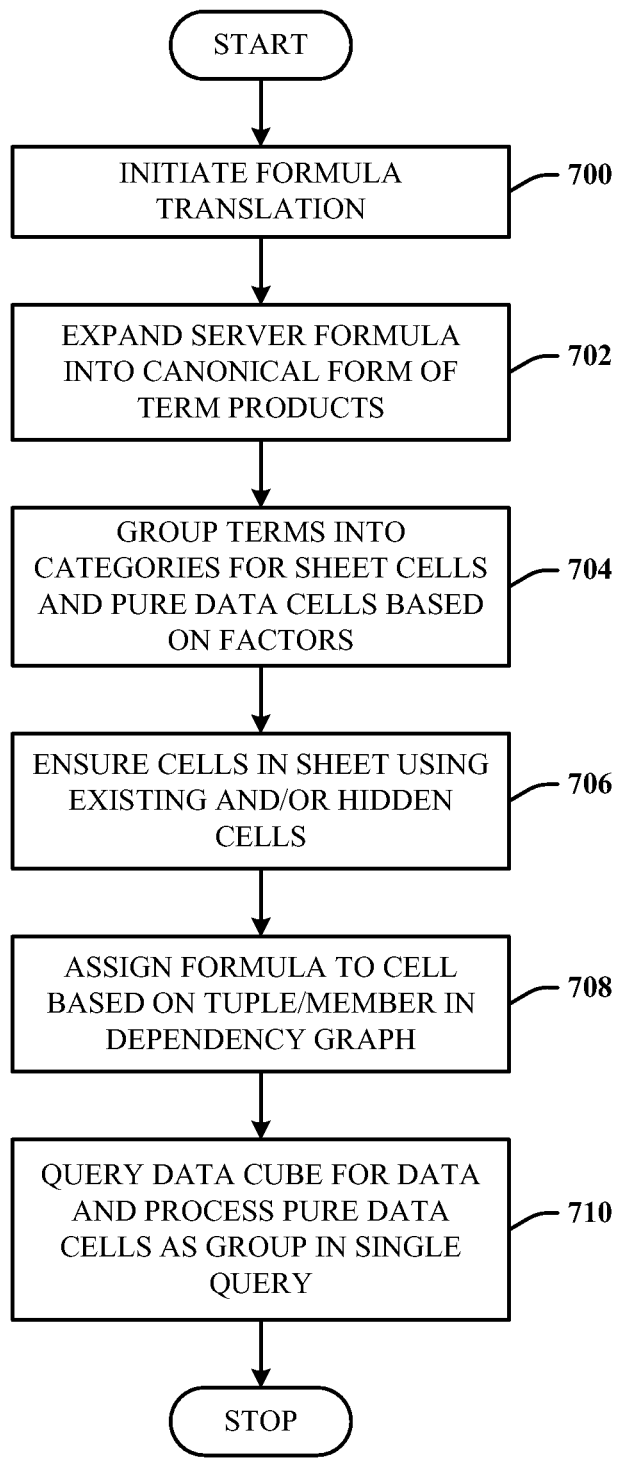
FIG. 7 illustrates a method of formula translation and the processing of data retrieval queries.

FIG. 7 illustrates a method of formula translation and the processing of data retrieval queries. Two cases to consider include where all edges are labeled by factors from a single formula and the incoming edges are aggregations.

If an internal node has all incoming edges labeled by factors of an MDX formula R, then that node receives a translated spreadsheet formula to be installed, derived from MDX formula R. In other words, in the first instance where all edges are labeled by factors from a single formula f, the spreadsheet formula is to be translated from the server formula f. The letter c is used to denote the current cell/member. At 700, formula translation is initiated. At 702, the server formula f is expanded into the canonical form so that f=term1+term2+, ..., where each term is a product of some factors. At 704, the terms are grouped into categories for sheet cells and pure data cells based on the factors. The first category contains all terms such that at least one of the factor in the term appears in an incoming edge to the cell/member c. The second category consists of all other terms.

At 706, the algorithm ensures there are cells in the sheet using existing cells and/or hidden cells. For all factors involved in the first category of terms, a cell is desired in the sheet to represent the first category. If the cell is already a cell in the original spreadsheet scope, then nothing is done; but if the cell is not already in, a hidden cell is created for this node.

At 708, a formula is assigned to a cell based on the cell being a tuple/member in the dependency graph. A check is performed to determine if the factor is either a tuple/member or a tuple set/member set. If the factor is tuple/member, then the factor is either in the dependency graph or not in the graph. If the factor is in the graph, then a formula is defined on this cell (using the same algorithm). If the factor is not part of the graph then the factor can be treated as a pure data which can be retrieved directly from the cube via MDX queries.

If a factor is a member set or tuple set function then the factor can be considered as a pure data cell if all the incoming edges labeled by that factor originate from cells that are not part of the graph. However, the factor is considered a formula if at least one incoming edge labeled by this factor originates from a graph node. The formula is then defined for this hidden cell. Without loss of generality, the function is assumed to be SUM(variable$_1$, variable$_2$, ..., variable$_n$, data$_1$, data$_2$, ..., data$_m$) where variables are cells in the graph and data are cells not in the graph. The formula for this hidden node is then SUM(variable$_1$, variable$_2$, ..., variable$_n$)+SUM(data$_1$, data$_2$, ..., data$_m$). Note that the second SUM( ) can be collapsed as a single pure data value $v_0$. Let $v_1$ be the current value of the factor and let $v_2$ be the current value of SUM (variable$_1$, variable$_2$, ..., variables), then $v_0$=$v_1$−$v_2$.

At 710, the data cube is queried for data and the pure data cells processed as group in a single query. For a hidden pure data cell, it is either a cell in the cube directly, or a member, tuple, member set, or tuple set function. For those hidden pure data cells which are cube cells directly, all such cells can be grouped together and retrieved in one MDX query. For other values, one query is issued for each such cell.

Assume the terms in the first category are $t_1, t_2, \ldots, t_n$, the current target cell value from the server is $v_1$, and the sum of the terms $t_1, t_2, \ldots t_n$ with the current input values is $v_2$. Then the formula for the target cell is $(v_1-v_2)+(t_1+t_2+\ldots+t_n)$.

In the second instance where the incoming edges are all aggregations, the formula is written as $f_1+f_2+\ldots+f_n+c$, where $f_1, f_2, \ldots f_n$ represent nodes in the dependency graph and c is a constant to be calculated. Let $v_1$ be the current value of the target cell and $v_2$ be the current value of $f_1+f_2+\ldots+f_n$. Then $c=v_1-v_2$, and therefore, the formula is $(v_1-v_2)+f_1+f_2+\ldots+f_n$.

In the above discussion it is assumed that $v_2$ can be calculated easily. This is indeed the case by using additional hidden spreadsheet cells which calculate $t_1+t_2+\ldots t_n$ or $f_1+f_2+\ldots f_n$.

Examples of formula translation now include the following. In a first example:

Revenue=price1*volume1+price2*volume2;

Price1 and volume1 are not on the sheet;
The translated formula: Revenue=price2*volume2+c.
In a second example:

Revenue=price1*volume1+price2*volume2;

Volume=Volume3*110%;

Volume3 is on the sheet and the rest of the cells are not;
The translated formula: Revenue=price1*hidden_cell+c; hidden_cell=110%*volume3.
In a third example:

Total revenue for all entities=(account.revenue,entity.all);

Sheet contains only account dimension and a single entity;
The translated formula: Total=(account.revenue, On_sheet_entity)+c.

With respect to algorithm complexity, there are several complexity measures considered. A first complexity measure considered is the computational complexity of generating the dependency graph. The complexity of the algorithm is directly related to the sum of dimension sizes (rather than size of cell space). Avoiding an algorithm that analyzes the whole cube space (which grows exponentially with dimension growth) is desired.

A second complexity measure considered is the formula translation and installing the formulas into the spreadsheet application. All the formula analysis and transformation is directly proportional to the formula size (the number of factors in the expression mainly). The number of formulas to be installed on the sheet depends on the complexity of the sheet. Note that a single server formula usually covers a region of display cells rather than a single cell so the formula translation does not have to be performed cell by cell, but rather formula by formula. Certain hidden cells are created to hold intermediate values and the number of such cells is bounded by the number of factors in each formula multiplied by the number of display cells on the sheet which use formulae. Both of these numbers are reasonably small.

Figure 8:
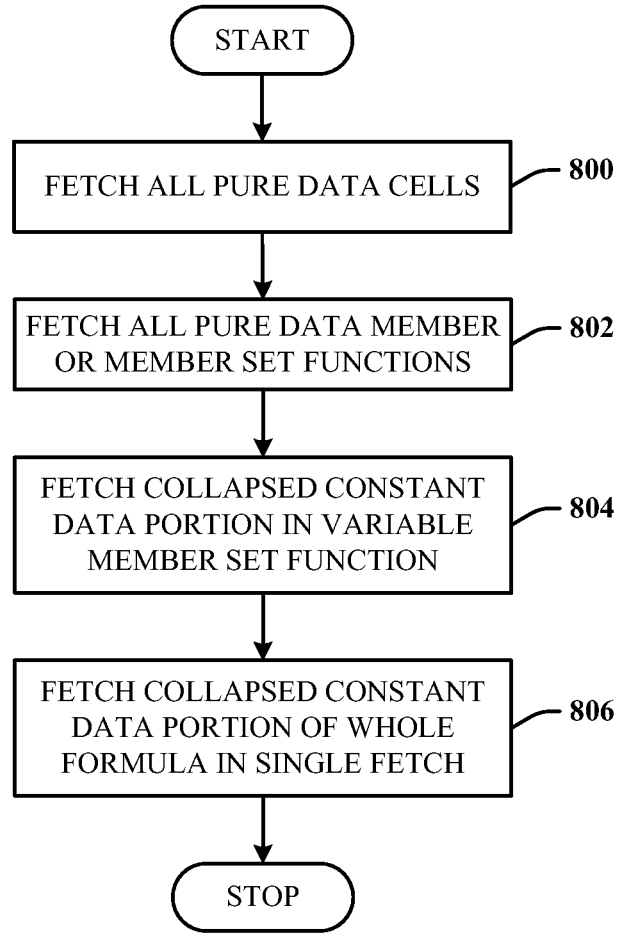
FIG. 8 illustrates a method of runtime processing.

FIG. 8 illustrates a method of runtime processing. A third complexity measure considered is the complexity of data retrieval (from the cube). Data is fetched from the cube at sheet loading time. Once the data is fetched from the server the rest of the calculation is self-contained and calculated on the sheet. In general, for each display region calculated by a particular server formula, the following data fetch operations are performed. At 800, all pure data cells are fetched (this can be done with a single MDX query). At 802, all pure data member or member set functions are fetched (the number of queries is bounded by the number of such functions in the formula which is usually a small number). At 804, the collapsed constant data portion in a variable member set function is fetched (this is bounded by the number functions in the formula). At 806, a single fetch is performed of the collapsed constant portion of the whole formula.

Note that the first and second complexity measure above are compile-time complexities, namely, that the work can be done at the sheet and rule design-time. The third complexity measure is a runtime complexity because it incurs every time a new sheet is loaded by an end user.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
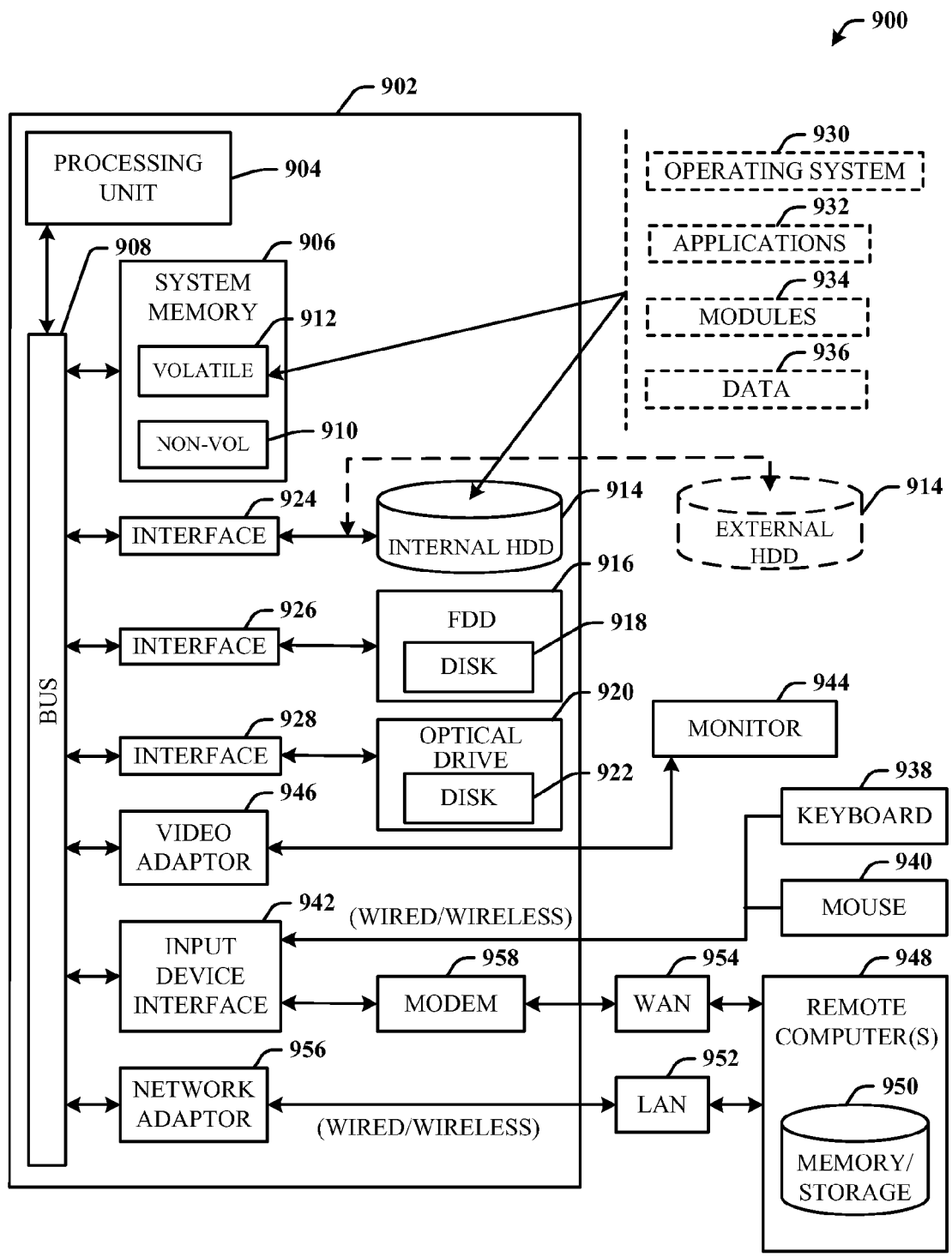
FIG. 9 illustrates a block diagram of a computing system operable to execute formula translation in accordance with the disclosed architecture.

Referring now to FIG. 9, there is illustrated a block diagram of a computing system 900 operable to execute formula translation in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. Where the computer 902 is employed as a server system, the one or more application programs 932, other program modules 934, and program data 936 can include the translation component 102, the server 104, the calculation rules 106, formulae 108, insertion component 112, dependency component 202, object component 204, and data cube 302, for example. Where the computer 902 is a client system, the one or more application programs 932, other program modules 934, and program data 936 can include the client application 110, the formulae 108, the objects 114, the spreadsheet applications 304 and corresponding sheets, for example.

All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954.

Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
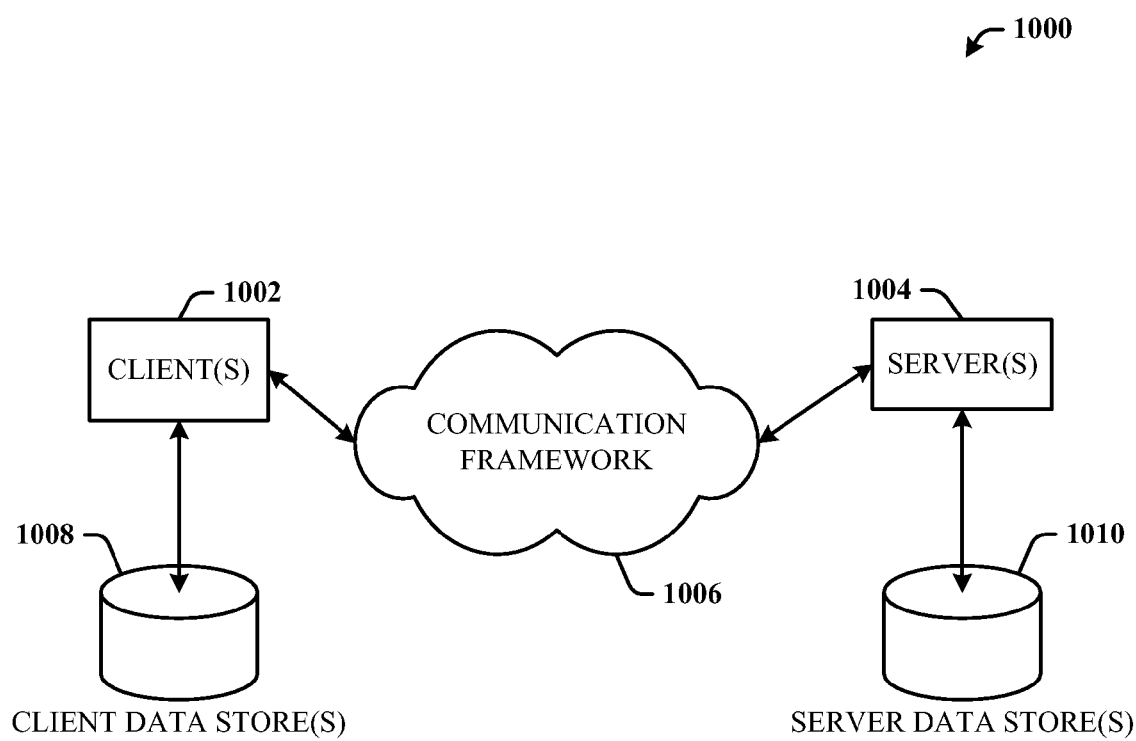
FIG. 10 illustrates a schematic block diagram of an exemplary computing environment for formula translation.

Referring now to FIG. 10, there is illustrated a schematic block diagram of an exemplary computing environment 1000 for formula translation. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s)

1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The client(s) 1002 can include the client application 110 for processing the formulae 108 and the objects 114, the spreadsheet applications 304 and corresponding sheets, for example. The server(s) 1004 can include the translation component 102, the server 104, the calculation rules 106, formulae 108, insertion component 112, dependency component 202, object component 204, and data cube 302, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for handling data, comprising:
    a server having a processor for executing computer-executable components stored in memory including:
    a dependency component for generating a dependency graph of cells dependent on input cells in a client spreadsheet application document of a client spreadsheet application and finding dependent cells based on the dependency graph, the dependent cells containing current values calculated via server calculation rules based on current data of the input cells in the client spreadsheet application document submitted to the server by the client spreadsheet application;
    a translation component for translating the server calculation rules into client spreadsheet application formulae, the server calculation rules defining one or more server calculations performed on the current data in the input cells of the client spreadsheet application document which require data that is not present in the client spreadsheet application document to provide the current values for the dependent cells, the client spreadsheet application formulae reducing a server calculation which requires data that is not present in the client spreadsheet application document to a client-side calculation, the client-side calculation using the current data of one or more input cells and a constant representing required data that is not present in the client spreadsheet application document to provide the current value of a particular dependent cell, the constant derived from the current data of the one or more input cells and the current value of the particular dependent cell; and
    an insertion component for inserting the client spreadsheet application formulae into the client spreadsheet application document in association with cells of the client spreadsheet application document, the client spreadsheet application formulae for calculating an updated value for the particular dependent cell by performing the client-side calculation using updated data of the one or more input cells and the constant without the client spreadsheet application submitting the updated data of the one or more input cells to the server.

2. The system of claim 1, wherein:
    the server is a performance management server,
    the server calculation rules are defined by a server-side data cube,
    the client spreadsheet application formulae for performing the client-side calculations are based on a query for data from the server-side data cube, and
    input cells in the client spreadsheet application document map to data cube cells of the server-side data cube.

3. The system of claim 1, wherein the client spreadsheet application formulae facilitate offline calculation of dynamic data changes in the cells of the client spreadsheet application document.

4. The system of claim 1, wherein:
    the dependency component finds dependent cells in a sheet of the client spreadsheet application document, the dependent cells in the sheet containing current values based on current data of input cells in the sheet calculated via the server calculation rules.

5. The system of claim 1, the computer-executable components further including:
    an object component for computing which cells of the client spreadsheet application document are mapped to a formula.

6. A computer-readable storage device storing computer-executable instructions that, when executed, cause a server computer to perform a computer-implemented method for handling data, the method comprising:
    generating a dependency graph of cells finding dependent on input cells in a client spreadsheet application document of a client spreadsheet application;
    finding dependent cells based on the dependency graph, the dependent cells containing current values calculated via server calculation rules based on current data of the input cells in the client spreadsheet application document submitted to the server by the client spreadsheet application;
    translating the server calculation rules into client spreadsheet application formulae, the server calculation rules defining one or more server calculations performed on the current data in the input cells of the client spreadsheet application document which require data that is not present in the client spreadsheet application document to provide the current values for the dependent cells, the client spreadsheet application formulae reducing a server calculation which requires data that is not present in the client spreadsheet application document to a client-side calculation, the client-side calculation using the current data of one or more input cells and a constant representing required data that is not present in the client spreadsheet application document to provide the current value of a particular dependent cell, the constant derived from the current data of the one or more input cells and the current value of the particular dependent cell; and
    inserting the client spreadsheet application formulae into the client spreadsheet application document in association with cells of the client spreadsheet application document, the client spreadsheet application formulae for calculating an updated value for the particular dependent cell by performing the client-side calculation using updated data of the one or more input cells and the constant without the client spreadsheet application submitting the updated data of the one or more input cells to the server.

7. The computer-readable storage device of claim 6, wherein the client spreadsheet application formulae facilitate offline calculation of dynamic data changes in the cells of the client spreadsheet application document.

8. The computer-readable storage device of claim 6, wherein:
the server calculation rules are defined by a server-side data cube,
the client spreadsheet application formulae for performing the client-side calculations are based on a query for data from the server-side data cube, and
the input cells in the client spreadsheet application document map to data cube cells of the server-side data cube.

9. The computer-readable storage device of claim 6, wherein the method further comprises:
analyzing dependencies of multi-dimensional expression formulae of the server; and
finding dimension level dependencies by transitive closure.

10. The computer-readable storage device of claim 6, wherein the method further comprises:
grouping the input cells in the client spreadsheet application document into a set of disjoint regions;
finding a combined set of dependent cells based on the regions; and
finding the dependent cells in the client spreadsheet application document based on the combined set.

11. The computer-readable storage device of claim 6, wherein the method further comprises:
trimming the dependency graph using a sheet of the client spreadsheet application document so that a node is in the dependency graph only if the node affects a cell on the sheet.

12. A computer-implemented method of handling data, comprising:
generating, by a server computer, a dependency graph of cells dependent on input cells in a client spreadsheet application document of a client spreadsheet application;
finding, by the server computer, dependent cells based on the dependency graph, the dependent cells containing current values calculated via server calculation rules based on current data of the input cells in the client spreadsheet application document submitted to the server computer by the client spreadsheet application;
translating, by the server computer, the server calculation rules into client spreadsheet application formulae, the server calculation rules defining one or more server calculations performed on the current data in the input cells of the client spreadsheet application document which require data that is not present in the client spreadsheet application document to provide the current values for the dependent cells, the client spreadsheet application formulae reducing a server calculation which requires data that is not present in the client spreadsheet application document to a client-side calculation, the client-side calculation using the current data of one or more input cells and a constant representing required data that is not present in the client spreadsheet application document to provide the current value of a particular dependent cell, the constant derived from the current data of the one or more input cells and the current value of the particular dependent cell; and
uploading, by the server computer, the client spreadsheet application formulae into the client spreadsheet application document in association with cells of the client spreadsheet application document, the client spreadsheet application formulae for calculating an updated value for the particular dependent cell by performing the client-side calculation using updated data of the one or more input cells and the constant without the client spreadsheet application submitting the updated data of the one or more input cells to the server.

13. The method of claim 12, further comprising:
assigning, by the server computer, the client spreadsheet application formulae to the cells in the client spreadsheet application document associated with internal nodes of the dependency graph.

14. The method of claim 12, further comprising:
trimming, by the server computer, the dependency graph using a sheet of the client spreadsheet application document so that a node is in the dependency graph only if the node affects a cell on the sheet.

15. The method of claim 12, further comprising:
finding, by the server computer, dependent cells in a sheet of the client spreadsheet application document that contain current values based on current data of input cells in the sheet calculated via the server calculation rules.

16. The method of claim 12, further comprising:
finding, by the server computer, dependent cells and input cells in a sheet of the client spreadsheet application document; and
treating, by the server computer, remaining cells of the sheet as pure data cells.

17. The method of claim 12, further comprising:
finding, by the server computer, the dependent cells in the client spreadsheet application document by computing a target member of a source member using an inverse mapping between the source member and the target member.

18. The method of claim 12, further comprising:
creating, by the server computer, hidden cells in a sheet of the client spreadsheet application document for holding intermediate values for the client spreadsheet application formulae.

19. The method of claim 12, further comprising:
querying, by the server computer, a server-side data cube for data; and
processing, by the server computer, pure data cells as a group in a single query.

20. The method of claim 12, further comprising:
analyzing, by the server computer, a portion of server-side data cube that defines the server calculation rules based on a sum of dimension sizes.

* * * * *